US012057257B2

(12) United States Patent
Kuo et al.

(10) Patent No.: US 12,057,257 B2
(45) Date of Patent: Aug. 6, 2024

(54) MULTI-LAYER COIL STRUCTURE AND INDUCTOR

(71) Applicant: ITG Electronics, Inc., New Taipei (TW)

(72) Inventors: Martin Kuo, New Taipei (TW); Nanhai Zhu, New Taipei (TW)

(73) Assignee: ITG ELECTRONICS, INC., New Taipei (TW)

( * ) Notice: Subject to any disclaimer, the term of this patent is extended or adjusted under 35 U.S.C. 154(b) by 589 days.

(21) Appl. No.: 17/321,636

(22) Filed: May 17, 2021

(65) Prior Publication Data

US 2022/0367107 A1 Nov. 17, 2022

(51) Int. Cl.

*H01F 27/29* (2006.01)
*H01F 27/24* (2006.01)
*H01F 41/04* (2006.01)

(52) U.S. Cl.

CPC ............. *H01F 27/29* (2013.01); *H01F 27/24* (2013.01); *H01F 41/04* (2013.01)

(58) Field of Classification Search

CPC ................................................ H01F 2027/2861
USPC ........................................................... 336/192
See application file for complete search history.

(56) References Cited

U.S. PATENT DOCUMENTS

2007/0176725 A1* 8/2007 Podlisk ............... H01F 27/2847 336/212
2012/0139686 A1* 6/2012 Christoph ............. H01F 27/263 29/606
2015/0206647 A1* 7/2015 Chen ................... H01F 27/2847 336/223
2015/0325361 A1* 11/2015 Zajc .................... H01F 27/2847 29/605

* cited by examiner

*Primary Examiner* — Ronald Hinson
(74) *Attorney, Agent, or Firm* — Li & Cai Intellectual Property (USA) Office

(57) ABSTRACT

A multi-layer coil structure and an inductor are provided. The multi-layer coil structure includes a first coil body and a second coil body. The first coil body includes a first extension portion and a second extension portion extending in a first direction, and at least one third extension portion extending in a second direction. The second coil body includes a fourth extension portion, a fifth extension portion, and at least one sixth extension portion, the fourth extension portion and the fifth extension portion extend in the first direction, and the at least one sixth extension portion extend in the second direction. When the first coil body is detachably assembled with the second coil body, at least one first pin is formed by the first extension portion and the fourth extension portion, and at least one second pin is formed by the second extension portion and the fifth extension portion.

10 Claims, 7 Drawing Sheets

MULTI-LAYER COIL STRUCTURE AND INDUCTOR

FIELD OF THE DISCLOSURE

The present disclosure relates to a multi-layer coil structure and an inductor, and more particularly to a multi-layer coil structure and an inductor having high efficiency and high power density.

BACKGROUND OF THE DISCLOSURE

Inductors are indispensable power products for electronic devices. A conventional inductor can only be disposed on a single circuit board, and can only achieve the effect of one-way input or output. Therefore, the applicability of the conventional inductor cannot be further enhanced.

In addition, when a larger inductor is used, the space consumed by the inductor in a power product is larger. Therefore, many designers focus on the process of downsizing the inductor elements, and an immense amount of effort and time are dedicated to seek an optimized solution.

SUMMARY OF THE DISCLOSURE

In response to the above-referenced technical inadequacies, the present disclosure provides a multi-layer coil structure and an inductor.

In one aspect, the present disclosure provides a multi-layer coil structure including a first coil body and a second coil body. The first coil body includes a first extension portion, a second extension portion, and at least one third extension portion, the first extension portion and the second extension portion extend in a first direction, and the at least one third extension portion extends in a second direction. The second coil body includes a fourth extension portion, a fifth extension portion, and at least one sixth extension portion, the fourth extension portion and the fifth extension portion extend in the first direction, and the at least one sixth extension portion extends in the second direction. When the first coil body is detachably assembled with the second coil body, at least one first pin is formed by the first extension portion and the fourth extension portion, and at least one second pin is formed by the second extension portion and the fifth extension portion.

In another aspect, the present disclosure provides an inductor including a first iron core body and a second iron core body. An accommodating space is defined between the first iron core body and the second iron core body. A multi-layer coil structure is disposed in the accommodating space. The multi-layer coil structure includes a first coil body and a second coil body. The first coil body includes a first extension portion, a second extension portion, and at least one third extension portion, the first extension portion and the second extension portion extend in a first direction, and the at least one third extension portion extends in a second direction. The second coil body includes a fourth extension portion, a fifth extension portion, and at least one sixth extension portion, the fourth extension portion and the fifth extension portion extend in the first direction, and the at least one sixth extension portion extends in the second direction. When the first coil body is detachably assembled with the second coil body, at least one first pin is formed by the first extension portion and the fourth extension portion, and at least one second pin is formed by the second extension portion and the fifth extension portion.

One of the beneficial effects of the multi-layer coil structure of the present disclosure is that the multi-layer coil structure can achieve the effect of multiple inputs and multiple outputs through the technical solutions of "a first coil body including a first extension portion, a second extension portion, and at least one third extension portion", "the first extension portion and the second extension portion extending in a first direction, and the at least one third extension portion extending in a second direction", "a second coil body including a fourth extension portion, a fifth extension portion, and at least one sixth extension portion, the fourth extension portion and the fifth extension portion extending in the first direction, and the at least one sixth extension portion extending in the second direction", and "when the first coil body is detachably assembled with the second coil body, at least one first pin is formed by the first extension portion and the fourth extension portion, and at least one second pin is formed by the second extension portion and the fifth extension portion".

Another one of the beneficial effects of the inductor of the present disclosure is that the inductor can achieve the effect of multiple inputs and multiple outputs through the technical solutions of "an accommodating space being defined between the first iron core body and the second iron core body", "a multi-layer coil structure disposed in the accommodating space, the multi-layer coil structure including a first coil body and a second coil body; the first coil body including a first extension portion, a second extension portion, and at least one third extension portion, the first extension portion and the second extension portion extending in a first direction, and the at least one third extension portion extending in a second direction", "the second coil body including a fourth extension portion, a fifth extension portion, and at least one sixth extension portion, the fourth extension portion and the fifth extension portion extending in the first direction, and the at least one sixth extension portion extending in the second direction", and "when the first coil body is detachably assembled with the second coil body, at least one first pin is formed by the first extension portion and the fourth extension portion, and at least one second pin is formed by the second extension portion and the fifth extension portion".

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
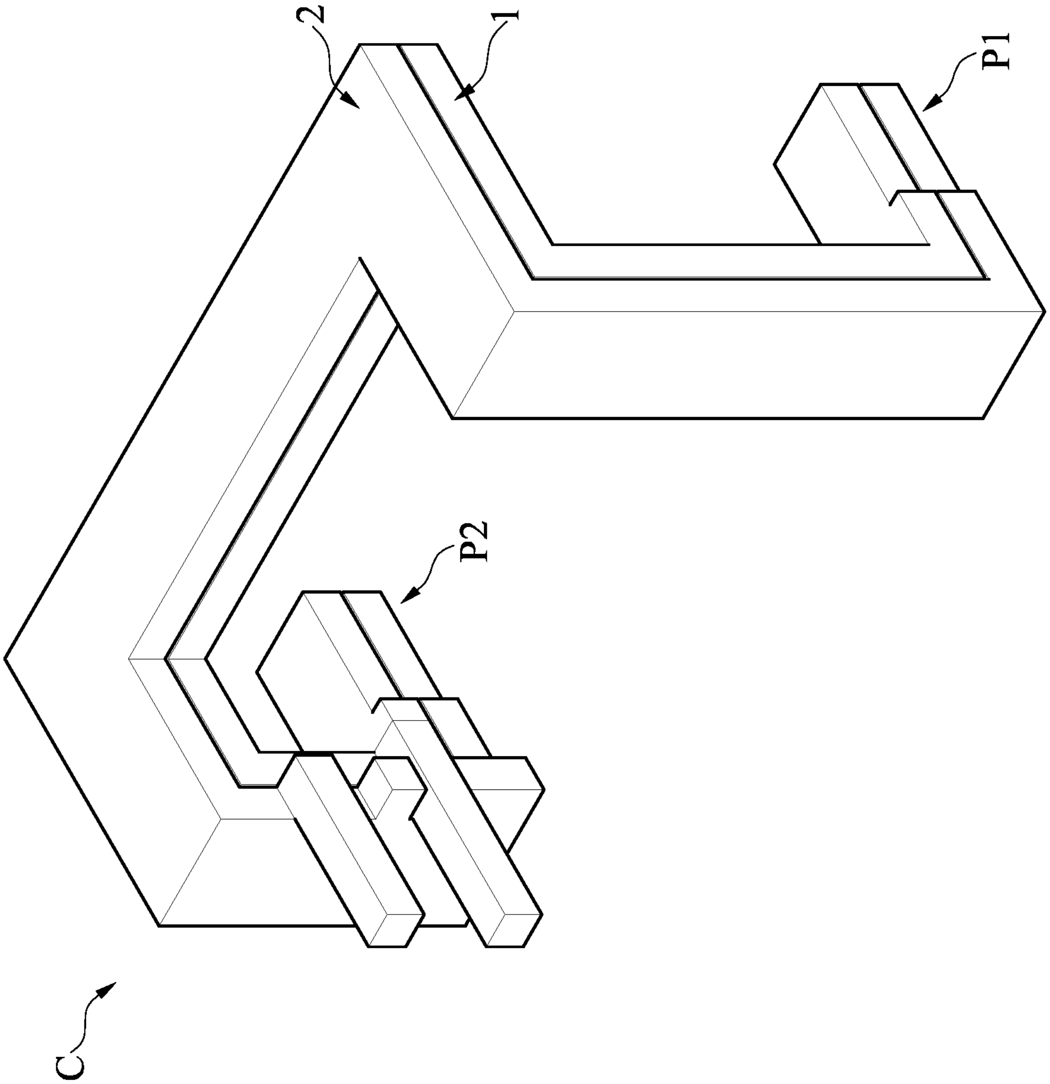
FIG. 1 is a schematic structural view of a multi-layer coil structure from a first perspective according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
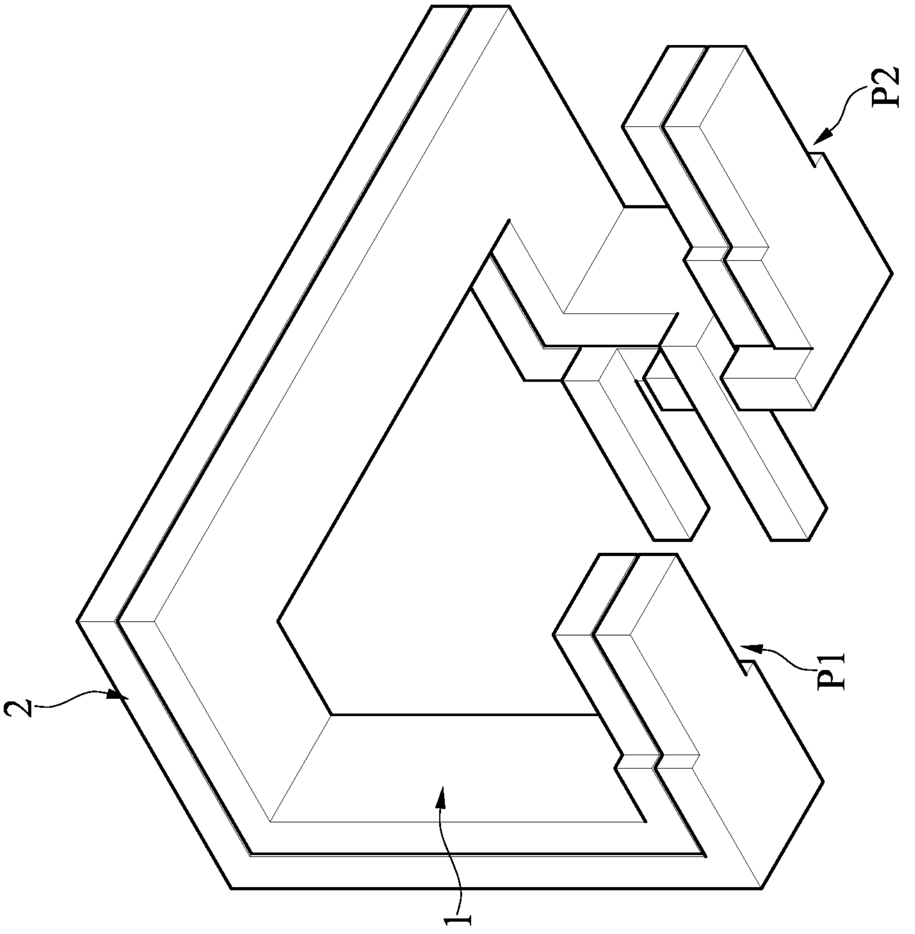
FIG. 2 is a schematic structural view of the multi-layer coil structure from a second perspective according to the first embodiment of the present disclosure.
Figure 3:
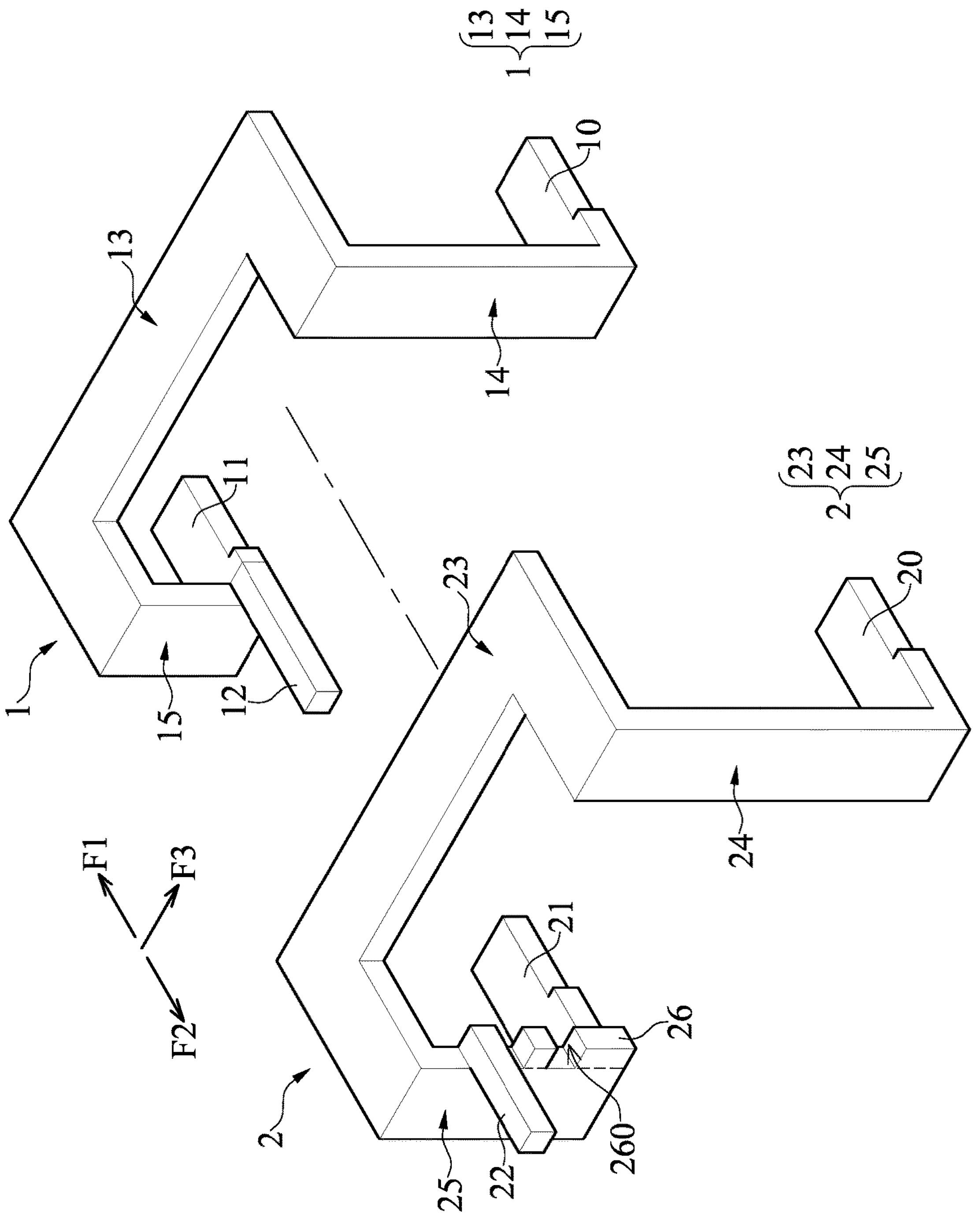
FIG. 3 is a schematic exploded view of a multi-layer coil structure from the first perspective according to the first embodiment of the present disclosure.
Figure 4:
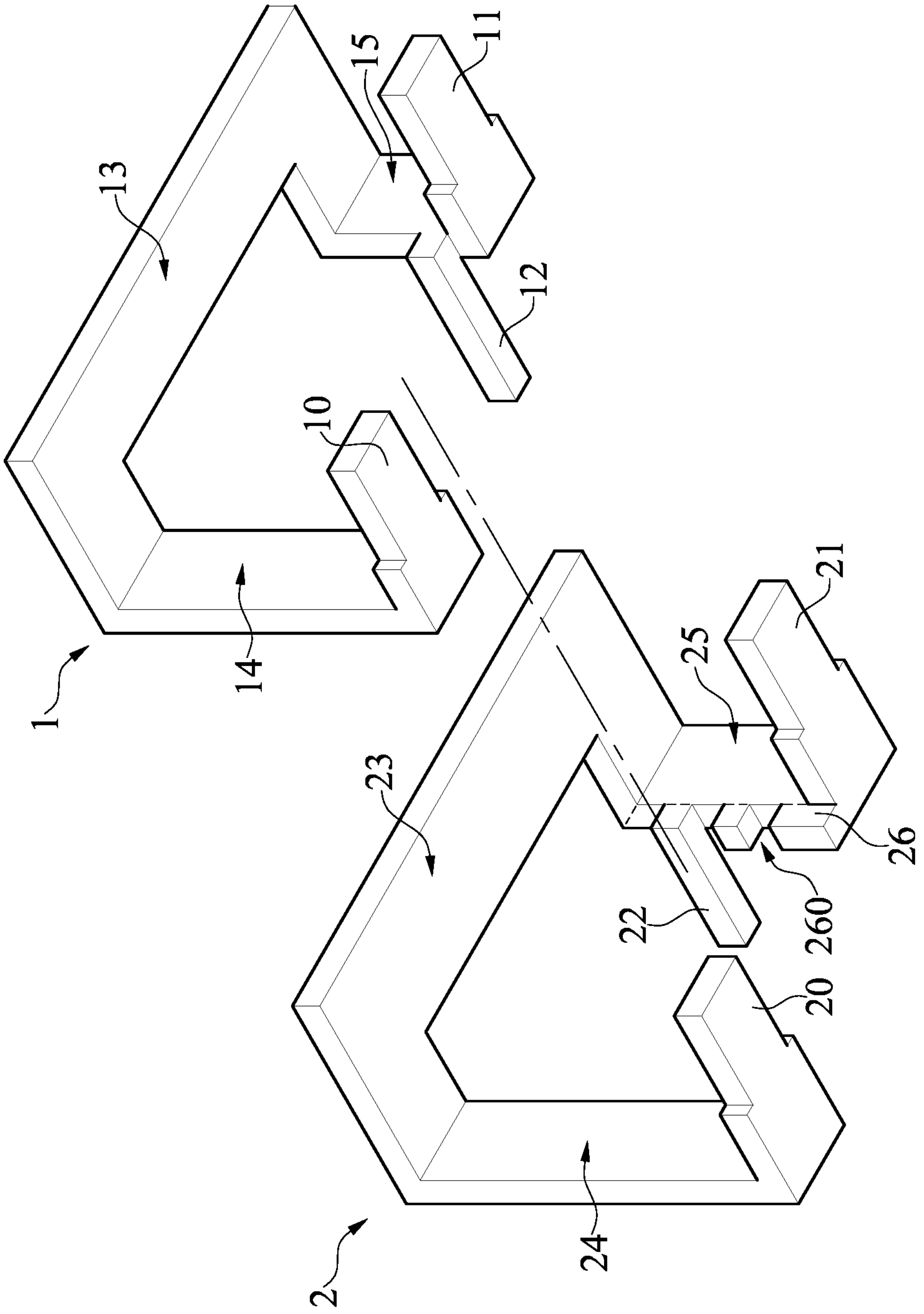
FIG. 4 is a schematic exploded view of the multi-layer coil structure from the second perspective according to the first embodiment of the present disclosure.

References are made to FIG. 1 to FIG. 4. FIG. 1 is a schematic structural view of a multi-layer coil structure from a first perspective according to a first embodiment of the present disclosure. FIG. 2 is a schematic structural view of the multi-layer coil structure from a second perspective according to the first embodiment of the present disclosure. FIG. 3 is a schematic exploded view of a multi-layer coil structure from the first perspective according to the first embodiment of the present disclosure. FIG. 4 is a schematic exploded view of the multi-layer coil structure from the second perspective according to the first embodiment of the present disclosure. As shown in the figures, the first embodiment of the present disclosure provides a multi-layer coil structure C including a first coil body 1 and a second coil body 2. The first coil body 1 and the second coil body 2 can be round coils or flat coils. In this embodiment, the first coil body 1 and the second coil body 2 are exemplified as flat coils, but the present disclosure is not limited thereto. The first coil body 1 and the second coil body 2 can also be made of stamped copper sheet, or made of other types of conductive materials.

First, as shown in FIG. 3 and FIG. 4, the first coil body 1 can include a first extension portion 10, a second extension portion 11, and at least one third extension portion 12. The first extension portion 10 and the second extension portion 11 extend in a first direction F1, and the at least one third extension portion 12 extends in a second direction F2. The first direction F1 and the second direction F2 are opposite to each other. The first extension portion 10, the second extension portion 11, and at least one third extension portion 12 are formed by a main body of the first coil body 1 extending outwardly.

Moreover, as shown in FIG. 3 and FIG. 4, the main body of the first coil body 1 can have a first main portion 13, a first supporting portion 14, and a second supporting portion 15. The first main portion 13, the first supporting portion 14, and the second supporting portion 15 can be a single member that is integrated and homogeneous. The first main portion 13 can be C-shaped, one end of the first supporting portion 14 is connected to one end of the first main portion 13, and one end of the second supporting portion 15 is connected to another end of the first main portion 13. The first supporting portion 14 and the second supporting portion 15 can be perpendicular to the first main portion 13, but the present disclosure is not limited thereto. In addition, the first extension portion 10 can be formed by extending another end of the first supporting portion 14 in the first direction F1, and the second extension portion 11 can be formed by extending another end of the second supporting portion 15 in the first direction F1, and the at least one third extension portion 12 can be formed by extending a lateral side of the second supporting portion 15 in the second direction F2. The first extension portion 10 and the second extension portion 11 are parallel to the first main portion 13.

Furthermore, as shown in FIG. 3 and FIG. 4, the second coil body 2 can include a fourth extension portion 20, a fifth extension portion 21, and at least one sixth extension portion 22. The fourth extension portion 20 and the fifth extension portion 21 extend in the first direction F1, and the at least one sixth extension portion 22 extends in the second direction F2. The fourth extension portion 20, the fifth extension portion 21, and the at least one sixth extension portion 22 are formed extending from a main body of the second coil body 2 outwardly. In addition, a shape of the main body of the first coil body 1 is the same as a shape of the main body of the second coil body 2, and a size of the main body of the first coil body 1 is different from a size of the main body of the second coil body 2. In this embodiment, the main body of the first coil body 1 is exemplified as being smaller than the main body of the second coil body 2, but the present disclosure is not limited thereto.

Furthermore, as shown in FIG. 3 and FIG. 4, the main body of the second coil body 2 can include a second main portion 23, a third supporting portion 24, and a fourth supporting portion 25. The second main portion 23, the third supporting portion 24, and the fourth supporting portion 25 can be a single member that is integrated and homogeneous. The second main portion 23 can be C-shaped, one end of the third supporting portion 24 is connected to one end of the second main portion 23, and one end of the fourth supporting portion 25 is connected to another end of the second main portion 23. The third supporting portion 24 and the fourth supporting portion 25 are perpendicular to the second main portion 23, but the present disclosure is not limited thereto. In addition, the fourth extension portion 20 is formed by extending another end of the third supporting portion 24 in the first direction F1, and the fifth extension portion 21 is formed by extending another end of the fourth supporting portion 25 in the first direction F1, and the at least one sixth extension portion 22 is formed by extending a lateral side of the fourth supporting portion 25 in the second direction F2. The fourth extension portion 20 and the fifth extension portion 21 are parallel to the second main portion 23.

Therefore, as shown in FIG. 1 to FIG. 4, when the first coil body 1 is detachably assembled with the second coil body 2, the multi-layer coil structure C of the present disclosure can be completed; at the same time, at least one first pin P1 can be formed by the first extension portion 10 and the fourth extension portion 20, and at least one second pin P2 can be formed by the second extension portion 11 and the fifth extension portion 21. The at least one first pin P1 and the at least one second pin P2 can be connected to an external substrate (e.g., a circuit board, but not limited thereto), or the at least one first pin P1 and the at least one second pin P2 can also be plugged into the external substrate. Furthermore, when the first coil body 1 and the second coil body 2 are in non-insulating contact, the first extension portion 10 can be combined with the fourth extension portion 20 to form one first pin P1, and the second extension portion 11 can be combined with the fifth extension portion 21 to form one second pin P2. When the first coil body 1 and the second coil body 2 are in insulating contact, the first extension portion 10 and the fourth extension portion 20 can each form an independent first pin P1 (i.e., two first pins P1). Similarly, the second extension portion 11 and the fifth extension portion 21 can each also form independent second pins P2 (i.e., two second pins P2). In addition, the at least one third extension portion 12 and the at least one sixth extension portion 22 can also be combined to form a third pin (not labeled in the figures), or the at least one third extension portion 12 and the at least one sixth extension portion 22 can each form an independent third pin.

Therefore, the multi-layer coil structure C of the present disclosure, through the above-mentioned technical solutions, in addition to providing a multi-layer coil structure C that can be applied to inductors, more importantly, a plurality of pins (including the at least one first pin P1 and the at least one second pins) can be formed by the first extension portion 10, the second extension portion 11, and the at least one third extension portion 12 of the first coil body 1, and the fourth extension portion 20, the fifth extension portion 21, and the sixth extension portion 22 of the second coil body 2 of the multi-layer coil structure C, and the pins can be used to connect a plurality of substrates, so as to achieve the effect of multiple inputs and multiple outputs with the substrates.

In addition, the main body of the second coil body 2 of the multi-layer coil structure C of the present disclosure can further include a positioning portion 26, which can be formed by extending a lateral side of the fourth supporting portion 25 in a third direction F3, and the positioning portion 26 has an opening 260, and the at least one third extension portion 12 is detachably penetrated through the opening 260. As shown in FIG. 1 to FIG. 4, the positioning portion 26 and the at least one sixth extension portion 22 can be formed on an identical side of the fourth supporting portion 25, and the opening 260 of the positioning portion 26 can be used to fix the at least one third extension portion 12 of the first coil body 1. The third direction F3 can be perpendicular to the first direction F1 or the second direction F2.

It is worth mentioning that directions which the first main body 13, the first supporting portion 14, the second supporting portion 15, the fourth extension portion 20, the fifth extension portion 21, and the sixth extension portion 22 of the present disclosure are not limited to the first direction F1, the second direction F2, or the third direction F3 that are mentioned above, and can be determined by users or manufacturers in practice.

However, the above-mentioned example is only one of the feasible embodiments and is not intended to limit the present disclosure.

Second Embodiment

Figure 5:
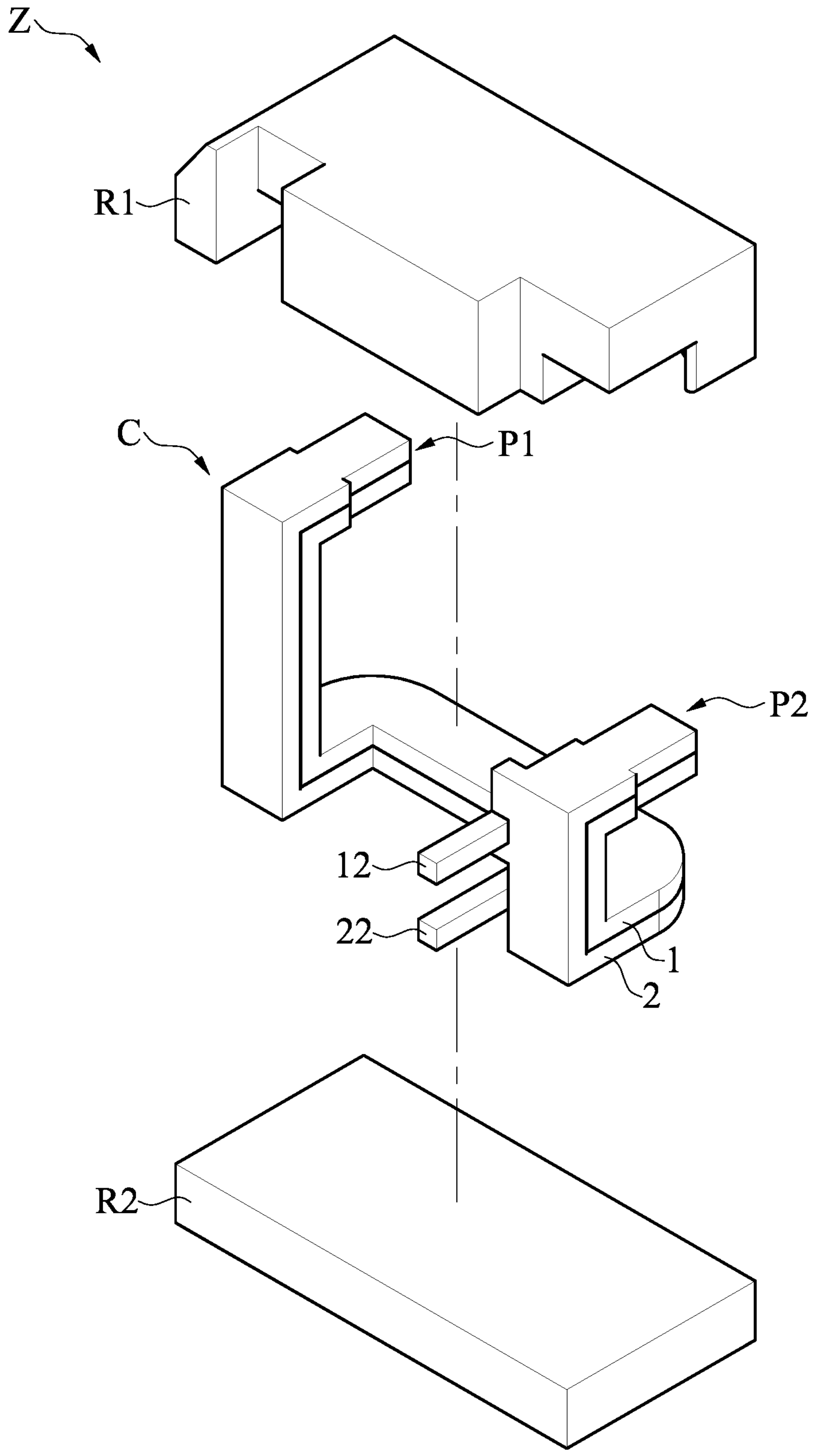
FIG. 5 is a schematic exploded view of an inductor from a first perspective according to a second embodiment of the present disclosure.
Figure 6:
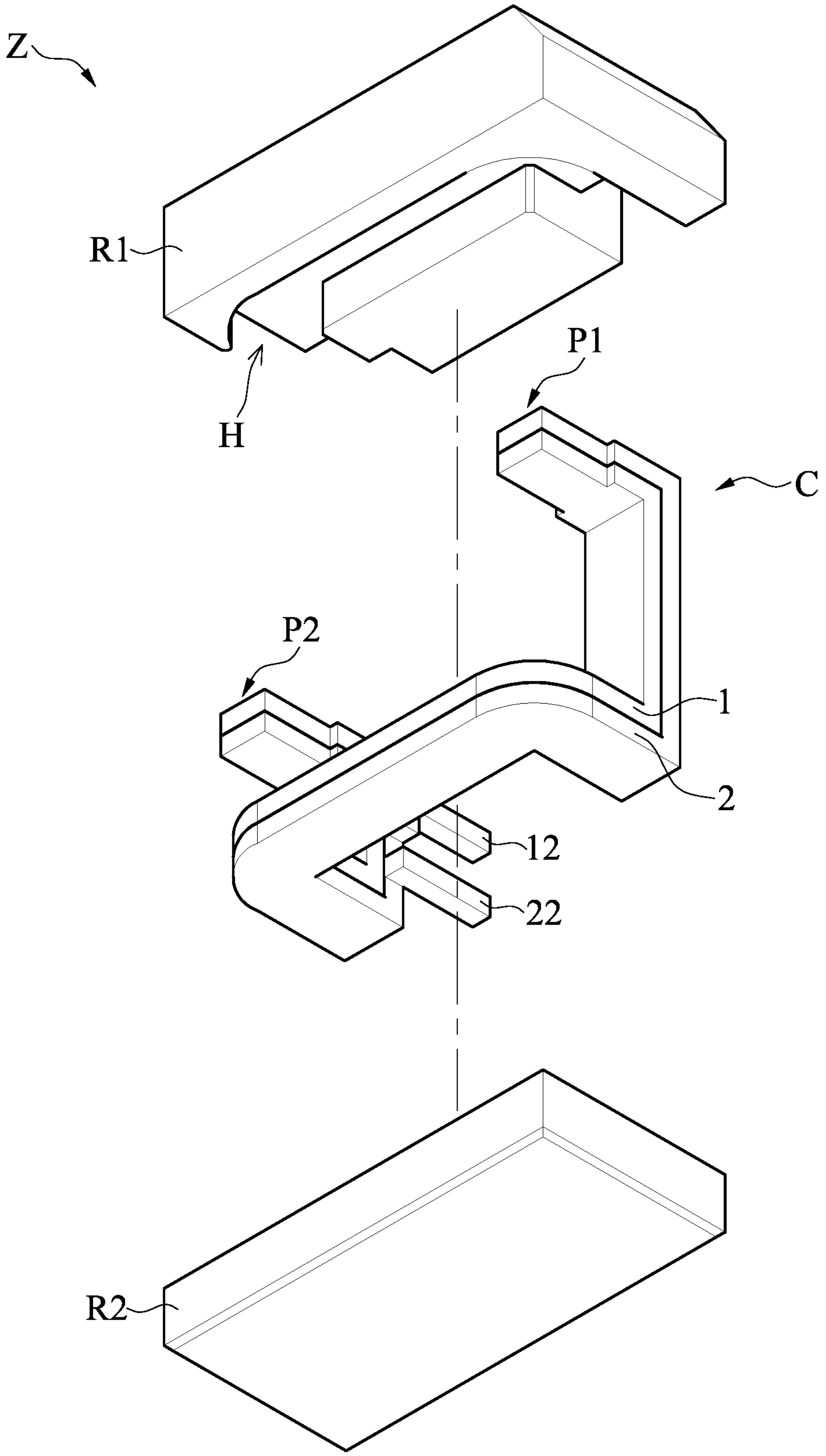
FIG. 6 is a schematic exploded view of the inductor from a second perspective according to the second embodiment of the present disclosure.
Figure 7:
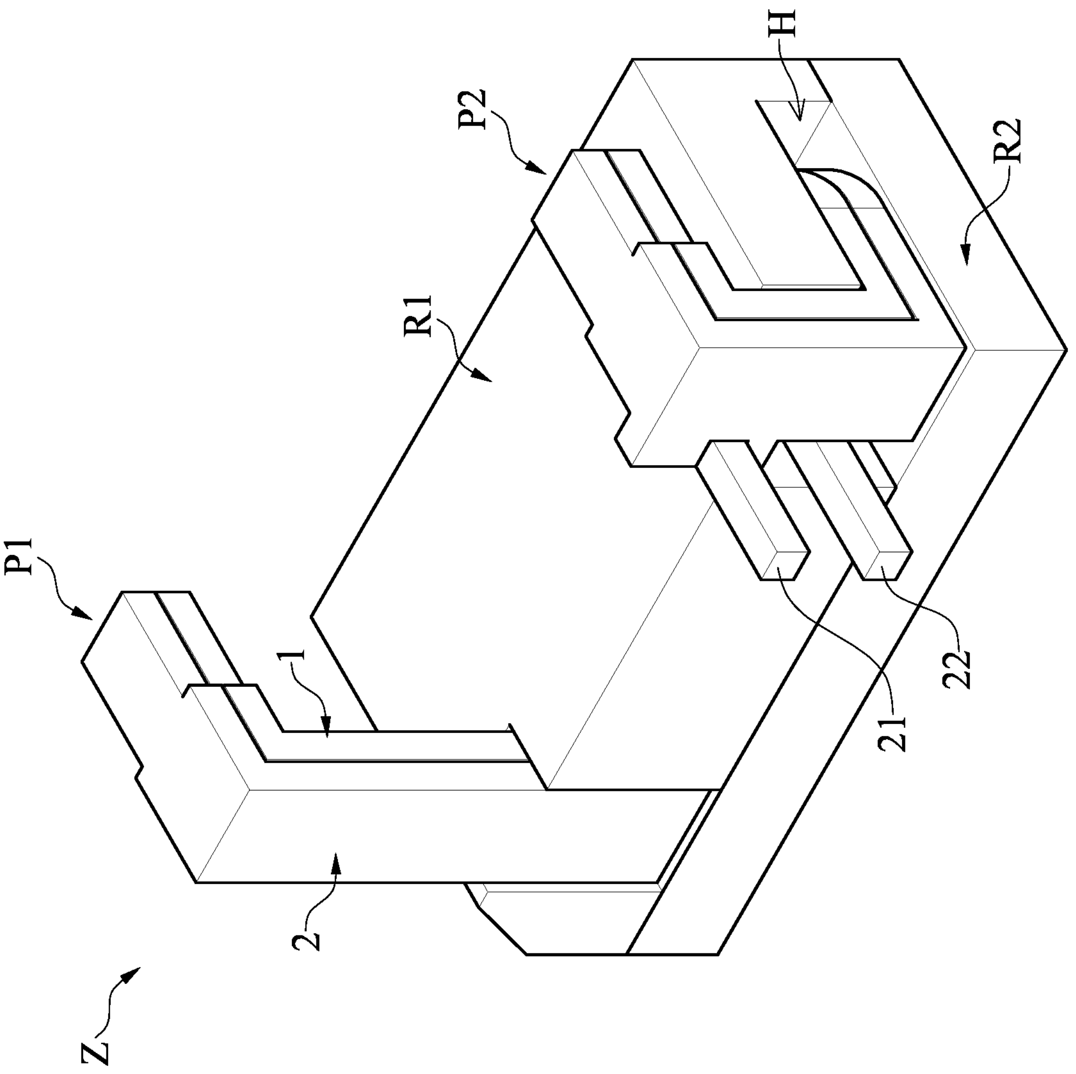
FIG. 7 is a schematic perspective view of the inductor according to the second embodiment of the present disclosure.

References are made to FIG. 5 to FIG. 7, which are to be read in conjunction with FIG. 1 to FIG. 4. FIG. 5 is a schematic exploded view of an inductor from a first perspective according to a second embodiment of the present disclosure. FIG. 6 is a schematic exploded view of the inductor from a second perspective according to the second embodiment of the present disclosure. FIG. 7 is a schematic perspective view of the inductor according to the second embodiment of the present disclosure. As shown in the figures, the second embodiment of the present disclosure provides an inductor Z including the multi-layer coil structure C as described in the first embodiment. That is to say, the inductor Z of this embodiment includes a first iron core body R1, a second iron core body R2, and a multi-layer coil structure C.

As shown in FIG. 1 to FIG. 6, the first iron core body R1 and the second iron core body R2 can be made of ferrite or soft magnetic materials, but not limited thereto. An accommodating space H is defined between the second iron core body R2 and the first iron core body R1. In this embodiment, the accommodating space H is mainly formed on the first iron core body R1, but the present disclosure is not limited thereto. The accommodating space H can also be formed in the second iron core body R2, or the second iron core body R2 and the first iron core body R1 can both be partially recessed, and be combined to form the accommodating space H. The accommodating space H can be used for accommodating the multi-layer coil structure C. The multi-layer coil structure C can include a first coil body 1 and a second coil body 2. The specific structure and implementations of the multi-layer coil structure C are already described in the first embodiment, and will not be reiterated herein.

Therefore, as shown in FIG. 5 to FIG. 7, after the multi-layer coil structure C is assembled with the first iron core body R1 and the second iron core body R2, the multi-layer coil structure C can be accommodated in the accommodating space H, and the first pin P1 formed by the extension portion 10 and the fourth extension portion 20 and the second pin P2 formed by the second extension portion 11 and the fifth extension portion 21 can be exposed outside the first core body R1. At the same time, the at least one third extension portion 12 and the at least one sixth extension portion 22 are also exposed outside the first iron core body R1 and the second iron core body R2.

Therefore, by virtue of the multi-layer coil structure C formed between the second iron core body R2 and the first iron core body R1, the main body of the first coil body 1 being connected with the first extension portion 10, the second extension portion 11, and the at least one third extension portion 12, so as to form an integral structure, and the main body of the second coil body 2 being connected with the fourth extension portion 20, the fifth extension portion 21, and the at least one sixth extension portion 22, so as to form another integral structure, the size of the inductor Z of the present disclosure can be reduced by the multi-layer coil structure C, the current path can be reduced, the power consumption of the inductor Z can be reduced, and the heat resistance between the inductor Z and other elements can be improved, so as to achieve the effect of high efficiency and high power density.

However, the above-mentioned example is only one of the feasible embodiments and is not intended to limit the present disclosure.

Beneficial Effects of the Embodiments

One of the beneficial effects of the multi-layer coil structure C of the present disclosure is that the multi-layer coil structure C can achieve the effect of multiple inputs and multiple outputs through the technical solutions of "a first coil body 1 including a first extension portion 10, a second extension portion 11, and at least one third extension portion 12", "the first extension portion 10 and the second extension portion 11 extending in a first direction F1, and the at least one third extension portion 12 extending in a second direction F2", "a second coil body 2 including a fourth extension portion 20, a fifth extension portion 21, and at least one sixth extension portion 22, the fourth extension portion 20 and the fifth extension portion 21 extending in the first direction F1, and the at least one sixth extension portion 22 extending in the second direction F2", and "when the first coil body 1 is detachably assembled with the second coil body 2, at least one first pin P1 is formed by the first extension portion 10 and the fourth extension portion 20, and at least one second pin P2 is formed by the second extension portion 11 and the fifth extension portion 21".

Another one of the beneficial effects of the inductor Z of the present disclosure is that the inductor Z can achieve the effect of multiple inputs and multiple outputs through the technical solutions of "an accommodating space H being defined between the first iron core body R1 and the second iron core body R2", "a multi-layer coil structure C disposed in the accommodating space H, the multi-layer coil structure C including a first coil body 1 and a second coil body 2; the first coil body 1 including a first extension portion 10, a second extension portion 11, and at least one third extension portion 12, the first extension portion 10 and the second extension portion 11 extending in a first direction F1, and the at least one third extension portion 12 extending in a second direction F2", "the second coil body 2 including a fourth extension portion 20, a fifth extension portion 21, and at least one sixth extension portion 22, the fourth extension portion 20 and the fifth extension portion 21 extending in the first direction F1, and the at least one sixth extension portion 22 extending in the second direction F2", and "when the first coil body 1 is detachably assembled with the second coil body 2, at least one first pin P1 is formed by the first extension portion 10 and the fourth extension portion 20, and at least one second pin P2 is formed by the second extension portion 11 and the fifth extension portion 21".

Furthermore, through the above technical solutions, a plurality of pins (including the at least one first pin P1 and the at least one second pins) can be formed by the first extension portion 10, the second extension portion 11, and the at least one third extension portion 12 of the first coil body 1, and the fourth extension portion 20, the fifth extension portion 21, and the sixth extension portion 22 of the second coil body 2, and the pins can be used to connect a plurality of substrates, such that the multi-layer coil structure C and the inductor Z of the present disclosure can achieve the effect of multiple inputs and multiple outputs with the substrates, greatly improve connections among the elements and substrates in a system, and efficiency and stability of signal transmission. In addition, when the multi-layer coil structure C is applied to the inductor Z, by virtue of the main body of the first coil body 1 being connected with the first extension portion 10, the second extension portion 11, and the at least one third extension portion 12, so as to form an integral structure, and the main body of the second coil body 2 being connected with the fourth extension portion 20, the fifth extension portion 21, and the at least one sixth extension portion 22, so as to form another integral structure, the size of the inductor Z of the present disclosure can be reduced by the multi-layer coil structure C, the current path can be reduced, the power consumption of the inductor Z can be reduced, and the heat resistance between the inductor Z and other elements can be improved, so as to achieve the effect of high efficiency and high power density.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A multi-layer coil structure, comprising:

a first coil body including a first extension portion, a second extension portion, and at least one third extension portion, the first extension portion and the second extension portion extending in a first direction, and the at least one third extension portion extending in a second direction; and a second coil body including a fourth extension portion, a fifth extension portion, and at least one sixth extension portion, the fourth extension portion and the fifth extension portion extending in the first direction, and the at least one sixth extension portion extending in the second direction;

wherein the fifth extension portion does not contact the at least one sixth extension portion, wherein, when the first coil body is detachably assembled with the second coil body, at least one first pin is formed by the first extension portion and the fourth extension portion, and at least one second pin is formed by the second extension portion and the fifth extension portion, the at least one sixth extension portion does not contact the second extension portion and the third extension portion.

2. The multi-layer coil structure according to claim 1, wherein a shape of a main body of the first coil body is identical to a shape of a main body of the second coil body, and a size of the main body of the first coil body is different from a size of the main body of the second coil body, and wherein the first direction and the second direction are opposite to each other.

3. The multi-layer coil structure according to claim 1, wherein the main body of the first coil body includes a first main portion, a first supporting portion, and a second supporting portion, the first main portion is C-shaped, an end of the first supporting portion is connected to an end of the first main portion, and an end of the second supporting portion is connected to another end of the first main portion; wherein the first extension portion is formed by another end of the first supporting portion extending in the first direction, the second extension portion is formed by another end of the second supporting portion extending in the first direction, and the at least one third extension portion is formed by a lateral side of the second supporting portion extending in the second direction; wherein the first supporting portion and the second supporting portion are perpendicular to the first main portion, and the first extension portion and the second extension portion are parallel to the first main portion.

4. The multi-layer coil structure according to claim 1, wherein the main body of the first second coil body includes a second main portion, a third supporting portion, and a fourth supporting portion, the second main portion is C-shaped, an end of the third supporting portion is connected to an end of the second main portion, and an end of the fourth supporting portion is connected to another end of the second main portion; wherein the fourth extension portion is formed by another end of the third supporting portion extending in the first direction, the fifth extension portion is formed by another end of the fourth supporting portion extending in the first direction, and the at least one sixth extension portion is formed by a lateral side of the fourth supporting portion extending in the second direction; wherein the third supporting portion and the fourth supporting portion are perpendicular to the second main portion, and the first fourth extension portion and the fifth extension portion are parallel to the second main portion.

5. The multi-layer coil structure according to claim 4, wherein the main body of the second coil body further includes a positioning portion that is formed by the lateral side of the fourth supporting portion extending in a third direction, the positioning portion has an opening, the at least one third extension portion is detachably penetrated through the opening; wherein the third direction is perpendicular or parallel to the second direction.

6. An inductor, comprising:

a first iron core body;

a second iron core body, an accommodating space being defined between the first iron core body and the second iron core body; and a multi-layer coil structure disposed in the accommodating space, the multi-layer coil structure including:

a first coil body including a first extension portion, a second extension portion, and at least one third extension portion, the first extension portion and the second extension portion extending in a first direction, and the at least one third extension portion extending in a second direction; and a second coil body including a fourth extension portion, a fifth extension portion, and at least one sixth extension portion, the fourth extension portion and the fifth extension portion extending in the first direction, and the at least one sixth extension portion extending in the second direction;

wherein the fifth extension portion does not contact the at least one sixth extension portion, wherein, when the first coil body is detachably assembled with the second coil body, at least one first pin is formed by the first extension portion and the fourth extension portion, and at least one second pin is formed by the second extension portion and the fifth extension portion, the at least one sixth extension portion does not contact the second extension portion and the third extension portion.

7. The inductor according to claim 6, wherein a shape of a main body of the first coil body is identical to a shape of a main body of the second coil body, and a size of the main body of the first coil body is different from a size of the main body of the second coil body, and wherein the first direction and the second direction are opposite to each other.

8. The inductor according to claim 6, wherein the main body of the first coil body includes a first main portion, a first supporting portion, and a second supporting portion, the first main portion is C-shaped, an end of the first supporting portion is connected to an end of the first main portion, and an end of the second supporting portion is connected to another end of the first main portion; wherein the first extension portion is formed by another end of the first supporting portion extending in the first direction, the second extension portion is formed by another end of the second supporting portion extending in the first direction, and the at least one third extension portion is formed by a lateral side of the second supporting portion extending in the second direction; wherein the first supporting portion and the second supporting portion are perpendicular to the first main portion, and the first extension portion and the second extension portion are parallel to the first main portion.

9. The inductor according to claim 6, wherein the main body of the second coil body includes a second main portion, a third supporting portion, and a fourth supporting portion, the second main portion is C-shaped, an end of the third supporting portion is connected to an end of the second main portion, and an end of the fourth supporting portion is connected to another end of the second main portion; wherein the fourth extension portion is formed by another end of the third supporting portion extending in the first direction, the fifth extension portion is formed by another end of the fourth supporting portion extending in the first direction, and the at least one sixth extension portion is formed by a lateral side of the fourth supporting portion extending in the second direction; wherein the third supporting portion and the fourth supporting portion are perpendicular to the second main portion, and the fourth extension portion and the fifth extension portion are parallel to the second main portion.

10. The inductor according to claim 9, wherein the main body of the second coil body further includes a positioning portion that is formed by the lateral side of the fourth supporting portion extending in a third direction, the positioning portion has an opening, the at least one third extension portion is detachably and penetratingly disposed in the opening; wherein the third direction is perpendicular or parallel to the second direction.

* * * * *